Feb. 22, 1927.

L. F. BLUME 1,618,800

INDICATING INSTRUMENT

Filed Nov. 12, 1924

Inventor:
Louis F. Blume,
by His Attorney.

Patented Feb. 22, 1927.

1,618,800

UNITED STATES PATENT OFFICE.

LOUIS F. BLUME, OF PITTSFIELD, MASSACHUSETTS, ASSIGNOR TO GENERAL ELECTRIC COMPANY, A CORPORATION OF NEW YORK.

INDICATING INSTRUMENT.

Application filed November 12, 1924. Serial No. 749,548.

My invention relates to indicating instruments for use in connection with oil-immersed transformers.

In the operation of a transformer, it is important that the load be not permitted to exceed such a maximum value as may be safely carried without danger of overheating and injury to the windings or other part of the transformer structure. A transformer is commonly rated by specifying its maximum kilo-volt ampere capacity under specified average conditions. These conditions, particularly the ambient and oil temperatures, are variable through more or less wide ranges, however, with the result that the maximum load which the transformer can safely carry will also vary so as to be sometimes more and sometimes less than that indicated by its specified capacity rating. It is often important or desirable to know just what limit of load may be considered safe for a transformer to carry under conditions existing at the time so that it may be used to the greatest advantage. The general object of the invention is to provide an instrument for indicating in some suitable and convenient units the limit of load which a transformer may carry under conditions existing at the time.

Figure 1:
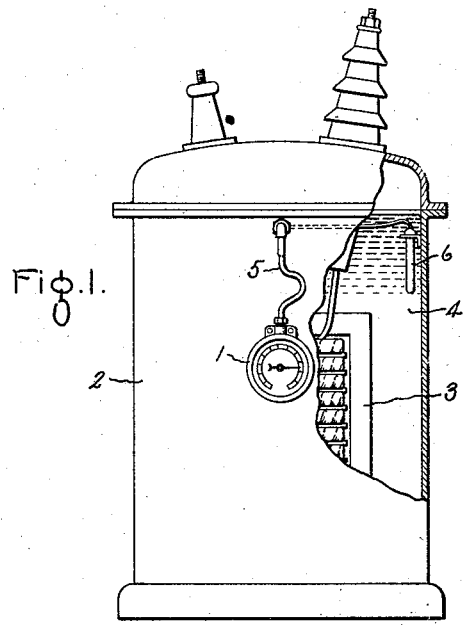
Figure 2:
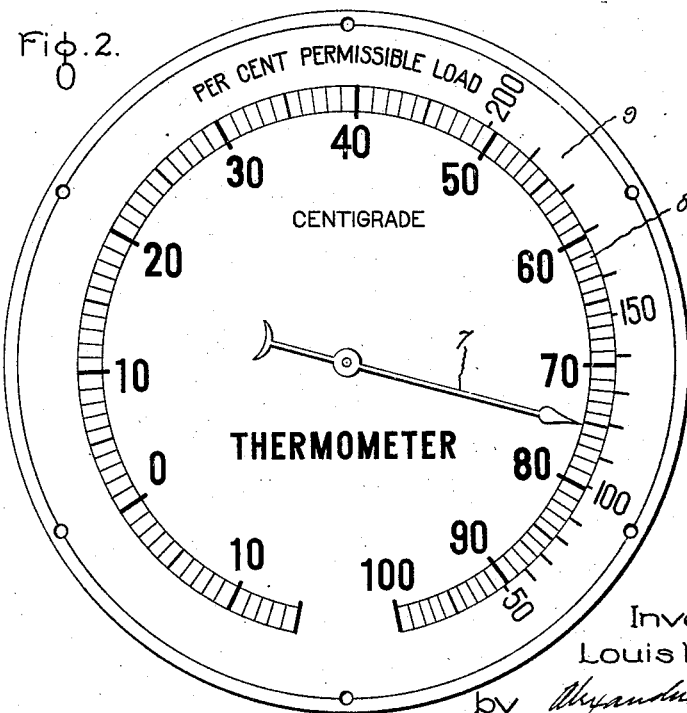

The invention will be better understood from the following description taken in connection with the accompanying drawing in which Fig. 1 shows an oil-immersed transformer equipped with an indicating instrument in accordance with the invention, part of the transformer casing being broken away to reveal the arrangement of parts inside; Fig. 2 shows the face of the indicating instrument with its pointer and scales.

In the particular embodiment of the invention shown in the drawing, an indicating instrument 1 is conveniently mounted on the casing 2 of a transformer 3 immersed in a body of cooling and insulating oil 4. The indicating instrument 1 is of the usual thermometer type commonly employed for indicating the temperature of transformer oil and is connected by a tube 5 with a bulb 6 immersed in the oil near the top of the casing 2 where the temperature of the oil is highest during operation of the transformer. The face of the instrument, as shown in Fig. 2, is provided with a pointer 7 arranged to travel over a temperature scale 8 which is graduated in centigrade degrees. Under the influence of temperature changes of the oil, the expansion and contraction of a suitable fluid in the bulb 6 actuates the pointer 7 to indicate at any time on the scale 8 the temperature of the oil surrounding the bulb.

Now the temperature of the oil alone is not a sufficient safeguard against operating the transformer with excessive internal temperatures because the temperature of the hottest part of the transformer is equal to the temperature of the hottest oil only after the transformer has been unloaded so long that the two temperatures have had time to become equalized. As soon as any load is taken from the transformer, the windings are quickly heated to temperatures above that of the hottest oil. Even with an excessive load which may be heating parts of the windings to dangerously high temperatures, it may be possible for the temperature of the hottest oil to be moderately low because of low temperature of the cooling medium employed. This cooling medium may be the surrounding air as in the case of self-cooled transformers or it may be water or both water and air as in the case of water-cooled transformers.

For any given hottest oil temperature, I have found that the permissible or maximum safe load which the transformer can carry without exceeding a specified safe maximum temperature is definite and fixed. So, for every temperature which the hottest oil may assume, it is possible to determine the corresponding permissible or maximum safe load, either by theoretical calculation or by simple test with suitable instruments. In accordance with the present invention, therefore, a scale 9, which may be called a permissible load scale, is provided on the face of the instrument 1 and over which the pointer 7 travels as it moves in response to changes in the temperature of the hottest oil surrounding the bulb 6. The permissible load scale 9 is graduated in any suitable load units to indicate the respective permissible or maximum safe loads for the corresponding positions of the pointer 7, the position of the pointer at any time being determined, as has been seen, by the temperature of the hottest oil. Each temperature indication on the scale 8 is thus directly opposite the corresponding maximum safe load indication on the scale 9. If desired, the temperature scale 8 may be omitted and the pointer 7 will indicate at all times on the scale 9 the limit of safe load which the transformer can carry.

In Fig. 2 of the drawing, the scale 9 is graduated to indicate the limit of safe load in percentage of the normal full load for which the transformer is designed under normal average conditions. The scale 9 may be graduated, however, in any other suitable load units such as in amperes or kilovolt-amperes.

The particular relationship of the values on the scales 8 and 9 as shown in Fig. 2 is of course not definitely fixed for all cases but will vary for different transformers and this relationship will also vary with the maximum temperature which may be considered safe for the hottest part of the windings of any given transformer. It is commonly considered that ninety-five degrees centigrade is the maximum safe temperature for the hottest part of the windings of a transformer. Assuming that this is true with a particular transformer for which the instrument indicated in the drawing is designed and calculated, then it will be seen that when the oil temperature is eighty degrees centigrade, the transformer can carry a maximum load equal to its full load rating (or 100% of its rated full load) without heating the windings above ninety-five degrees centigrade. If the temperature of the oil is greater than eighty degrees centigrade, then the load must be decreased in accordance with the position of the pointer 7 on the load scale 9 to prevent overheating of the windings of the transformer. If the temperature of the oil is less than eighty degrees centigrade, then the load may be increased, if desired, to any value up to that indicated by the pointer 7 on the load scale 9 without danger of overheating the windings.

The invention provides a very simple and approximately accurate means for indicating at a glance the limit of load which a transformer may safely carry and it enables an operator to obtain from his transformers their greatest possible output without danger of overloading them.

What I claim as new and desire to secure by Letters Patent of the United States, is,—

1. An indicating instrument for an oil-immersed transformer, said instrument comprising a pointer operable in response to temperature changes of the oil, and a scale over which said pointer travels, said scale being graduated in load units to indicate for each position of the pointer the limit of safe load which the transformer can carry.

2. An indicating instrument for an oil-immersed transformer, said instrument comprising a scale graduated in temperature units, a pointer operable in response to temperature changes of the oil and arranged to travel over said scale to indicate the temperature of the oil, and a second scale over which said pointer is also arranged to travel, said second scale being graduated in load units to indicate for each position of the pointer the limit of safe load which the transformer can carry.

In witness whereof, I have hereunto set my hand this tenth day of November, 1924.

LOUIS F. BLUME.